Jan. 29, 1929.
F. J. WILLETT
1,700,275
BAND SAW OILER
Filed July 13, 1927
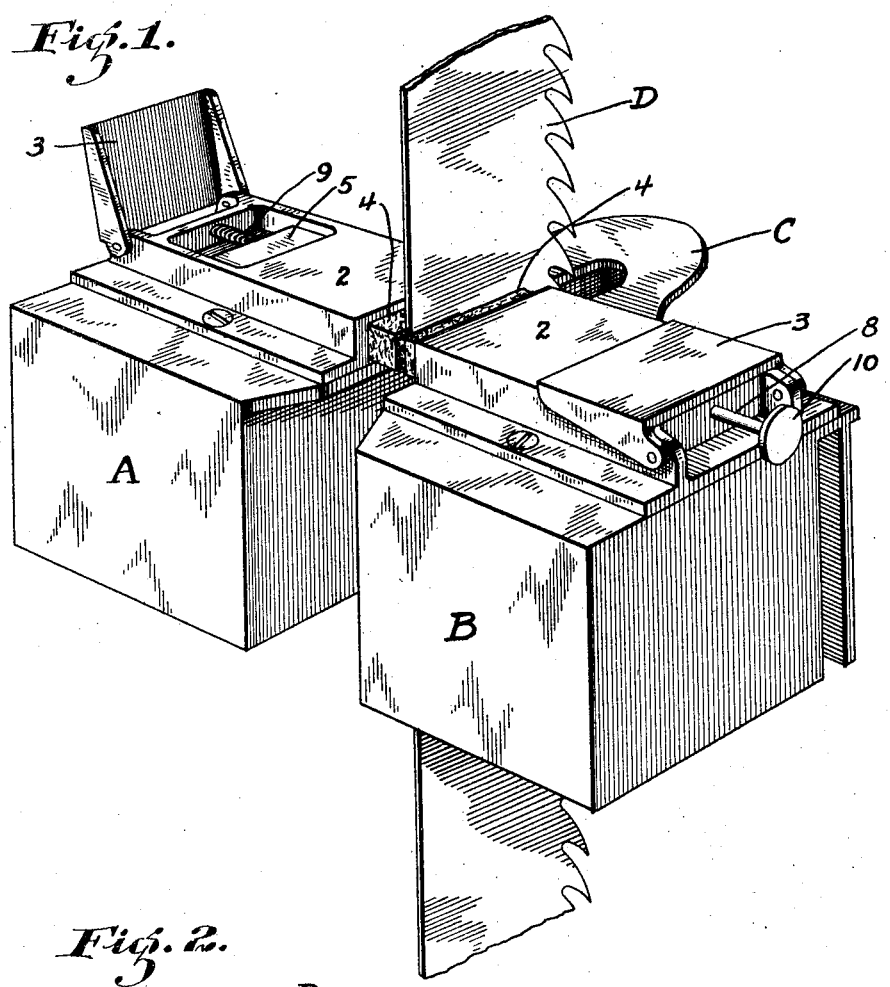
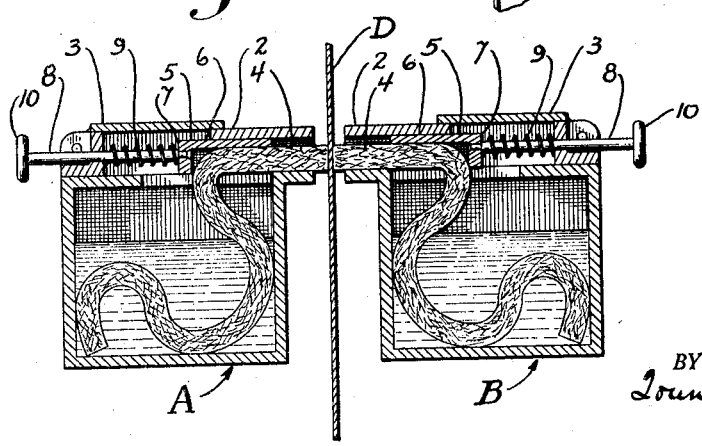
INVENTOR.
Frank J. Willett.
BY
Townsend, Loftus & Affett
ATTORNEYS.

Patented Jan. 29, 1929.

1,700,275

UNITED STATES PATENT OFFICE.

FRANK J. WILLETT, OF CAMINO, CALIFORNIA.

BAND-SAW OILER.

Application filed July 13, 1927. Serial No. 205,373.

This invention relates to a band saw oiler or in other words, to a device for automatically applying oil to the opposite faces of a band saw for the purpose of lubricating the blade of the saw and at the same time preventing deposition of pitch.

Certain varieties of grains in lumber contain considerable quantities of pitch and when the lumber is being cut or sawed by band saws, the pitch tends to coat the faces of the saw. This is very detrimental and it increases the power required to drive the saw; it tends to widen the cut and bind the saw; but worst of all it causes heating of the saw blade to such an extent that blistering, buckling and breakage is apt to take place unless the saw blade is changed several times during an average working day.

The object of the present invention is to generally improve and simplify the construction and operation of oilers of the character described; to provide an oiler which may be readily attached to any standard form of band saw; to provide an oiler in which the oil is fed by means of capillary attraction through wicks and applied to the opposite faces of the saw; and further to provide means whereby the wicks are maintained in contact with the opposite faces of the saw and also automatically advanced as they are worn away by rubbing action of the saw blade. The invention is shown by way of illustration in the accompanying drawings, in which:

Fig. 1 is a perspective view of the band saw oiler showing its position with relation to the saw blade, Fig. 2 is a central vertical longitudinal section of the oiler and the blade.

Referring to the drawings in detail, particularly Fig. 1, A and B indicate a pair of containers which serve the function of receptacles for oil or the like. These receptacles may be of any shape desired but are preferably square or rectangular as here illustrated. They are arranged on opposite sides of the saw blade and they are connected by a side extension such as shown at C. Each receptacle is provided with a head member such as shown at 2, these heads serving several function, first that of a pivotal support for auxiliary cover members such as shown at 3—3, and secondly, that of a guide for the wicking indicated at 4—4 and follower heads 5—5 cooperating therewith. Any suitable form of wicking may be employed and it is extended as shown in Fig. 1 so as to engage with the opposite faces of the saw blade. The remaining portion of each wick extends down into the containers or receptacles A and B and when these are filled with oil or the like, the oil is supplied by capillary attraction to the opposite faces of the saw blade.

A band saw blade travels at a fairly high speed and the rubbing action of the blade against the ends of the wicking causes the same to wear away. Means are accordingly provided whereby the wicks are automatically advanced as wear takes place, the means employed being the follower heads indicated at 5—5. Each follower head consists of a top section 6 and a rear end section 7. Each follower head is provided with a rod 8 and a surrounding spring 9 which is interposed between the cover member and the rear end of the follower head, the spring being sufficient to gradually advance the follower heads and the wicks indicated at 4 as wear takes place, thus automatically maintaining a continuous or constant contact between the wicks and the opposite faces of the blade. Each rod 8 is also provided with a head member 10 and this is grasped when it is desired to retract the head members and readjust the wicking.

In actual operation the containers A and B are placed on opposite sides of the saw blade D as shown in Fig. 1 and the receptacles are suitably secured with relation to the frame of the saw. Illustration of the supporting means has been avoided in the present instance as numerous methods may be employed. When the device is in position as shown in Fig. 1, it is only necessary to lift the covers 3 and to fill the receptacles with oil or a like liquid. Kerosene or the like is preferable as it not only serves as a lubricant for the blade D but it also acts as a strong solvent for the pitch and as such gradually removes or prevents deposition of pitch on the blade. The oil is, of course, automatically fed to the opposite faces by capillary attraction through the wicks and the wicks are at the same time automatically advanced and maintained in contact with the blade as they wear away due to the action of the follower heads 5—5. Deposition of pitch is, of course, prevented. The amount of power required to drive the blade is maintained at a minimum, and heating of the blade with the results usually following is prevented.

While certain features of the present invention are more or less specifically described, I wish it understood that various changes may be resorted to within the scope of the appended claims. Similarly, that various materials and finishes of the several parts employed may be such as the manufacturer may decide or varying conditions or uses may demand.

Having thus described my invention, what I claim and desire to secure by Letters Patent is:—

1. The combination with the saw blade of a band saw of a pair of containers adapted to be disposed one on each side of the blade, said containers forming receptacles for oil, a wick in each container and projecting therefrom to engage the opposite faces of the saw and to deliver oil thereto, and means for automatically maintaining the wicks in engagement with the opposite faces of the saw and for automatically advancing the wicks as they wear away by rubbing action of the saw blade.

2. The combination with the saw blade of a band saw of a pair of containers adapted to be disposed one on each side of the blade, said containers forming receptacles for oil, a wick in each container and projecting therefrom to engage the opposite faces of the saw and to deliver oil thereto, a guide member on each container to guide the projecting ends of the wicks, a follower head supported by each guide member and engageable with each wick, and means for automatically advancing the followers and the wicks engaged thereby so as to maintain the wicks in engagement with the opposite faces of the blade and to automatically advance the wicks as wear takes place.

3. The combination with the saw blade of a band saw of a pair of containers adapted to be disposed one on each side of the blade, said containers forming receptacles for oil, a wick in each container and projecting therefrom to engage the opposite faces of the saw and to deliver oil thereto, a guide member on each container to guide the projecting ends of the wicks, a follower head supported by each guide member and engageable with each wick, and a spring engageable with each follower to automatically advance the followers and the wicks engaged thereby so as to maintain the wicks in engagement with the opposite faces of the blade and to automatically advance the wicks as wear takes place.

4. The combination with the saw blade of a band saw of a pair of containers adapted to be disposed one on each side of the blade, said containers forming receptacles for oil, a wick in each container and projecting therefrom to engage the opposite faces of the saw and to deliver oil thereto, a guide member on each container to guide the projecting ends of the wicks, a follower head supported by each guide member and engageable with each wick, a spring engageable with each follower to automatically advance the followers and the wicks engaged thereby so as to maintain the wicks in engagement with the opposite faces of the blade and to automatically advance the wicks as wear takes place, and means for manually retracting the follower heads.

FRANK J. WILLETT.